US009342519B2

(12) United States Patent
Evans et al.

(10) Patent No.: US 9,342,519 B2
(45) Date of Patent: May 17, 2016

(54) SYSTEMS AND METHODS FOR A MEDIA APPLICATION INCLUDING AN INTERACTIVE GRID DISPLAY

(71) Applicant: VIACOM INTERNATIONAL INC., New York, NY (US)

(72) Inventors: Matthew Evans, New York, NY (US); Darren Brelesky, New York, NY (US); Dhimiter Bozo, New York, NY (US); Pier Borra, New York, NY (US)

(73) Assignee: VIACOM INTERNATIONAL INC., New York, NY (US)

( * ) Notice: Subject to any disclaimer, the term of this patent is extended or adjusted under 35 U.S.C. 154(b) by 153 days.

(21) Appl. No.: 14/103,554

(22) Filed: Dec. 11, 2013

(65) Prior Publication Data
US 2015/0161141 A1 Jun. 11, 2015

(51) Int. Cl.
G06F 17/22 (2006.01)
G06F 17/30 (2006.01)
H04L 29/06 (2006.01)
G06F 3/0484 (2013.01)
G06F 3/0481 (2013.01)

(52) U.S. Cl.
CPC ...... G06F 17/30058 (2013.01); G06F 3/04817 (2013.01); G06F 3/04842 (2013.01); G06F 3/04845 (2013.01); H04L 67/42 (2013.01)

(58) Field of Classification Search
None
See application file for complete search history.

(56) References Cited

U.S. PATENT DOCUMENTS

| 6,163,822 | A | 12/2000 | Christian et al. |
| 7,124,424 | B2 * | 10/2006 | Gordon et al. ................. 725/43 |
| 7,231,607 | B2 | 6/2007 | Neely et al. |
| 7,966,638 | B2 | 6/2011 | Gossweiler, III et al. |
| 8,191,104 | B2 * | 5/2012 | Gordon et al. ................ 725/151 |
| 8,225,361 | B2 * | 7/2012 | Feinberg et al. .............. 725/107 |
| 8,316,394 | B2 | 11/2012 | Yates |
| 8,385,813 | B2 | 2/2013 | Rao |
| 8,402,488 | B2 | 3/2013 | Craner |
| 8,443,387 | B2 * | 5/2013 | Gordon et al. ................... 725/43 |
| 8,555,315 | B2 * | 10/2013 | Woods et al. .................... 725/43 |
| 8,756,510 | B2 * | 6/2014 | Bhumkar et al. .............. 715/739 |
| 2004/0165006 | A1 | 8/2004 | Kirby et al. |
| 2005/0160113 | A1 | 7/2005 | Sipusic et al. |
| 2008/0092054 | A1 | 4/2008 | Bhumkar et al. |
| 2009/0178083 | A1 | 7/2009 | White et al. |
| 2010/0017725 | A1 | 1/2010 | McCarthy et al. |
| 2010/0306708 | A1 | 12/2010 | Trenz et al. |
| 2011/0078572 | A1 * | 3/2011 | Milazzo ......................... 715/733 |
| 2011/0093415 | A1 | 4/2011 | Rhee et al. |
| 2012/0278179 | A1 * | 11/2012 | Campbell et al. .......... 705/14.69 |
| 2012/0278330 | A1 * | 11/2012 | Campbell et al. ............. 707/740 |
| 2014/0053214 | A1 * | 2/2014 | Walker et al. .................... 725/62 |

FOREIGN PATENT DOCUMENTS

WO 2012/073027 6/2012

* cited by examiner

*Primary Examiner* — Maikhanh Nguyen
(74) *Attorney, Agent, or Firm* — Fay Kaplun & Marcin, LLP

(57) ABSTRACT

Described herein are systems and methods for a media application including an interactive grid display. A method may comprise displaying a grid including a central hub and a plurality of spokes connected to the central hub, inserting a first media element on a first spoke of the grid, the first media element including a first timestamp and activating a first media file, inserting a second media element on the first spoke of the grid, the second media element including a second timestamp and activating a second media file, wherein the second media file is related to the first media file, comparing the first timestamp to the second timestamp, and arranging the presentation of the first and second media elements along the first spoke based on the compared first and second timestamps.

15 Claims, 3 Drawing Sheets

System 100

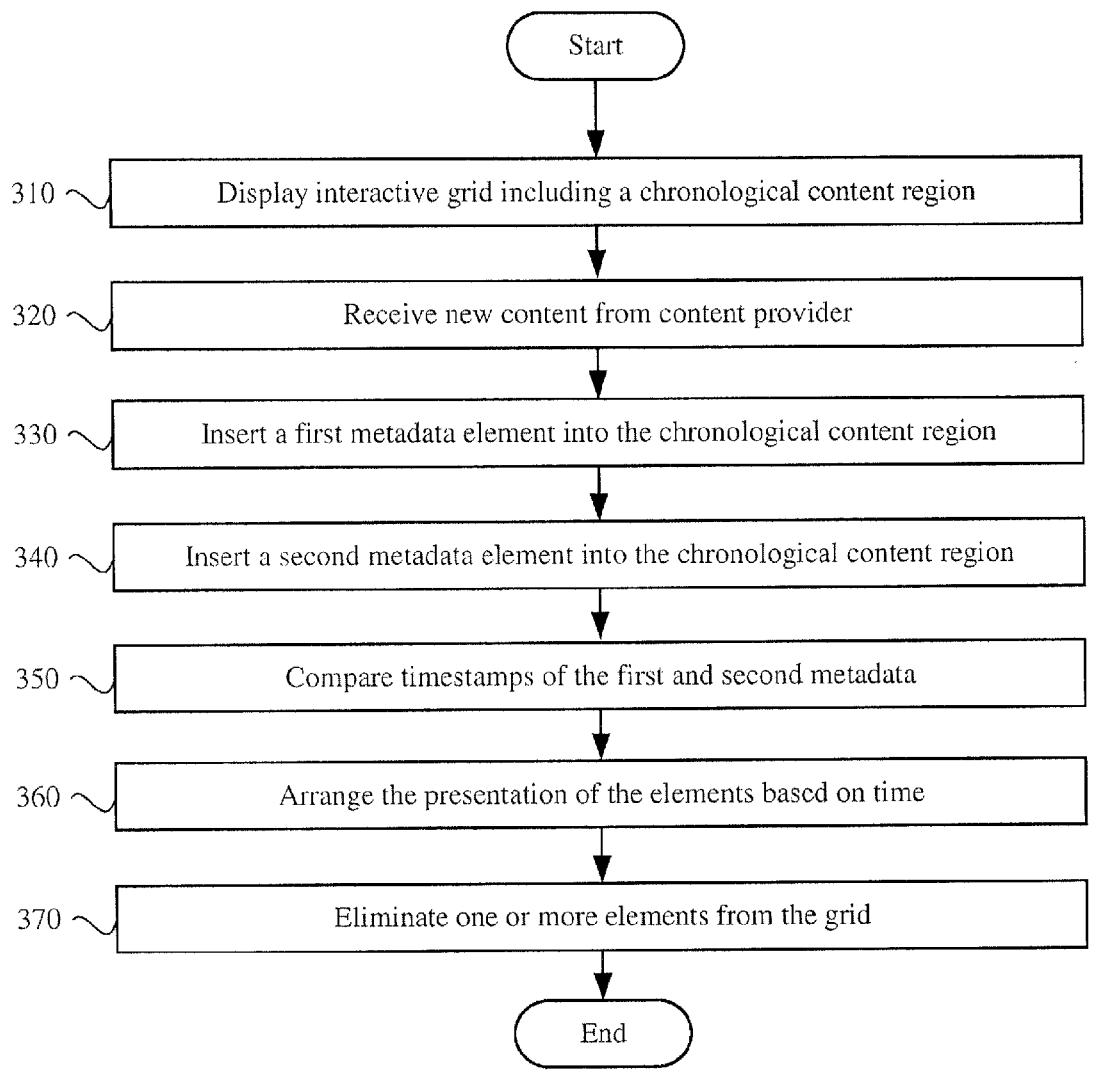

SYSTEMS AND METHODS FOR A MEDIA APPLICATION INCLUDING AN INTERACTIVE GRID DISPLAY

BACKGROUND

The term "application software" refers to any computer software that causes a computer to perform functional tasks beyond the running of the computer itself. Application software applies the power of a particular computing platform or system software to a particular purpose. Specific instance of this software are called software applications, applications or simply "apps." The term app is used in contrast to system software that typically manages and integrates the capabilities of a computing device but does not directly perform tasks that benefit the user. In other words, the system software serves the app, while the app in turn serves the user.

In recent years, the term "mobile app" has been used to primarily refer to applications for mobile computing devices such as smartphones, tablets, etc. Mobile apps are usually available to a consumer through various application distribution platforms, such as "app stores," that are typically operated by the owner of the mobile operating system for the mobile computing device. While mobile apps were originally offered for general productivity and information retrieval (e.g., email, calendar, contacts, etc.), the functionality of mobile apps has expanded into other categories such as stock market and weather information, GPS and location-based-services, banking, order-tracking, and entertainment such as mobile games and media presentation. In the field of media presentation, mobile apps are used to provide an end user with streaming multimedia to the mobile computing device. Streaming multimedia refers to media that is constantly received by and presented to an end-user while being delivered by a content provider.

DESCRIPTION OF THE DRAWINGS

FIG. 3 shows an exemplary method displaying media application including an interactive grid and populating the grid with media elements.

DETAILED DESCRIPTION

Figure 1:
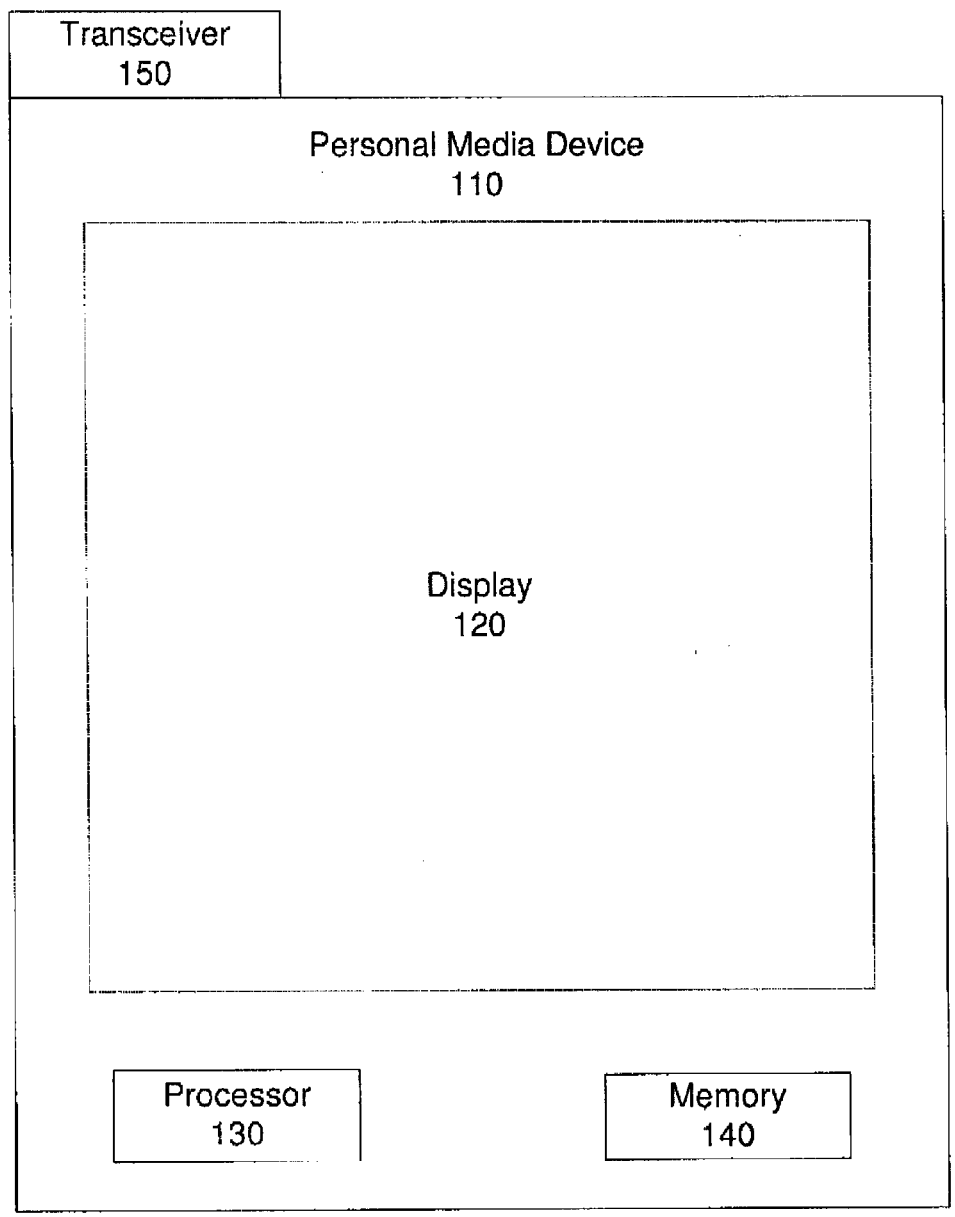
FIG. 1 shows an exemplary system for displaying media application including an interactive grid populated with multiple media elements.

Described herein are systems and methods for a media application including an interactive grid display. A method may comprise displaying a grid including a central hub and a plurality of spokes connected to the central hub, inserting a first media element on a first spoke of the grid, the first media element including a first timestamp and activating a first media file, inserting a second media element on the first spoke of the grid, the second media element including a second timestamp and activating a second media file, wherein the second media file is related to the first media file, comparing the first timestamp to the second timestamp, and arranging the presentation of the first and second media elements along the first spoke based on the compared first and second timestamps.

Further described herein is a device comprising a memory storing a plurality of rules, and a processor coupled to the memory and configured to perform actions that include, displaying a grid including a central hub and a plurality of spokes connected to the central hub, inserting a first media element on a first spoke of the grid, the first media element including a first timestamp and activating a first media file, inserting a second media element on the first spoke of the grid, the second media element including a second timestamp and activating a second media file, wherein the second media file is related to the first media file, comparing the first timestamp to the second timestamp, and arranging the presentation of the first and second media elements along the first spoke based on the compared first and second timestamps.

Further described herein is a non-transitory computer readable storage medium with an executable program stored thereon, wherein the program instructs a processor to perform actions that include displaying a grid including a central hub and a plurality of spokes connected to the central hub, inserting a first media element on a first spoke of the grid, the first media element including a first timestamp and activating a first media file, inserting a second media element on the first spoke of the grid, the second media element including a second timestamp and activating a second media file, wherein the second media file is related to the first media file, comparing the first timestamp to the second timestamp, and arranging the presentation of the first and second media elements along the first spoke based on the compared first and second timestamps.

The exemplary embodiments may be further understood with reference to the following description and the appended drawings, wherein like components are referred to with the same reference numerals. The exemplary embodiments show systems and methods for a media application including an interactive grid display. For instance, the interactive grid display allows for users to utilize a moveable layout of branded content within a software application operating on a computing device, such as a tablet computing device. The moveable layout of the exemplary display engages the user to explore and discover numerous pieces of themed-content, such as instant videos, on-demand videos, full-length episodic video content, photographs, news and media feeds, games, puzzles, user polls, etc. While the exemplary embodiments may be implemented by a processor operating software on a tablet computing device, one skilled in the art will understand that the media application having an interactive grid display may be operable on any other type of computing device, such as, but not limited to, a desktop computer, a laptop computer, a mobile phone, a personal digital assistant, etc.

While the exemplary embodiments described herein may relate to a mobile application executing on a tablet device, one skilled in the art will understand that the interactive grid display may be either a stand-alone software package or an integrated software component executing on a computing device.

According to the systems and methods described herein, the exemplary software application may include a GUI featuring an interactive grid of selectable media elements, such as icons, images, tiles, photographs, text boxes, etc. Based on user input (e.g., via touch screen or mouse pointer), the application may adjust the display of the grid accordingly. For instance, the user may input a swiping gesture to a touch screen of a tablet device running the exemplary software application. The swiping gesture allows the user to shift or pan the selectable media elements, or simply "elements," within the display. Thus, the user may be provided with omni-directional control of the presentation of the elements within the interactive grid. Furthermore, the user may input a multi-touch gesture to the touch screen, such as pinching gestures to zoom in and out of the display. Additional user inputs may include touch screen taps, long presses, scrolls, flicks, rotations, etc., as well as user input from a peripheral device such as a mouse, a trackball, a camera, a motion sensor, etc.

In addition, the user may alter the orientation of the display relative to the computing device based on a positioning of the device. For instance, the user may rotate the device to transition the display from a landscape mode to a portrait mode. Furthermore, the exemplary software application may adjust the elements/tiles within the interactive grid based on at least any of the interactions listed above. For instance, the transition from portrait display to landscape display may adjust the number of elements to be displayed on the device as well as the size and/or content of the elements. Alternatively, the orientation of the display may be locked into one particular display mode, such as landscape mode, to prevent inadvertent adjustments to the interactive grid display during use. Similarly, the zoom-in and zoom-out features of the software application may adjust the number of elements, the size of the elements, and/or the content of the elements.

Accordingly, the user zooming out or expanding the view of the interactive grid (e.g., using a touch screen gesture) may allow for the software application to display a greater number of elements within the grid. However, with a greater number of elements on display, the content within the elements (e.g., images, text, etc.) may be reduced or eliminated. Conversely, the user zooming in or contracting the view of the interactive grid may allow for the software application to display fewer elements within the grid. With fewer elements on display, content associated with each of the elements (e.g., images, text, etc.) may be added to the image or expanded upon.

As will be described in greater detail below, an arrangement of the elements within one embodiment of the interactive grid may include, for example, a centrally located featured content region, a followed content region and a chronological content region. According to this embodiment, the featured content region may be a hub including an icon, or cluster of icons, displayed to the user upon starting up the software application. The followed content region may surround the featured content region and may display any type of content selected to be followed by the user. The chronological content region may surround the followed content region and may display any non-featured and non-followed content based on chronological order. One skilled in the art will understand that any format may be used for displaying the elements/icons within the featured content region, the followed content region and the chronological content region, such as, but not limited to, a linear grid display, a mosaic display, etc.

The elements of the interactive grid may be displayed over a background image including a hub and spokes design, wherein a plurality of spokes may expand outwardly from the featured region in various directions to fill out the display on the device. Accordingly, the spokes of the design may serve as a navigational component to the user of the device. For instance, as the user explores the various elements of the interactive grid, the spokes may serve as a navigational reference for the user as to which way is back to central hub of the featured region.

According to one embodiment, the exemplary featured content region may serve as the central hub of the user's interactive experience representing the newest content on the grid. The exemplary followed content region may provide the user with the content that is most interesting to the user based on user preferences. Furthermore, portions of the chronological content region closest to the featured region may serve as the origin of the newest content that is neither featured nor followed by the user. As newer content is added to the interactive display, older content (e.g., elements, tiles, etc.) may be pushed away from the central hub towards the outer regions of the grid. Therefore, the most current content may be display at or around the central hub, while aging content may shift away from the hub towards a perimeter edge of the interactive grid, and eventually, off the grid.

As will be described in greater detail below, each content element may include a time stamp, wherein outdated content within the chronological content region may gradually transition away from the central featured region (e.g., startup display) based on a comparison to a time stamp on newer content. The display may retain a predetermined number of content elements within the chronological content region before removing the most outdated content based on the time stamp. In addition, the display may retain content on a temporal basis and remove any content having a time date past a predetermined date and/or time.

In addition, featured content region may be categorized by content type and/or content theme in order to display similar content within a centralized region. Alternatively, content related to a specific type (e.g., video clips, games, social media feeds, message posts, advertisements, etc.), may be displayed along a sub-region of the featured content region categorized for that content type. Furthermore, content related to specific theme (e.g., property, actor, character, etc.), may be selectively displayed within the followed content region based on a user selection, a content provider selection, etc.

FIG. 1 shows an exemplary system 100 for operating and displaying a media application including an interactive grid populated with multiple media elements. The exemplary system 100 may include personal media device 110 (e.g., smartphone, tablet computer, etc.) equipped with a display 120, a processor 130 and a memory 140, such as a non-transitory computer-readable storage medium. The media device 110 may be a computing device such as, for example, tablet, smart phone, notebook computer, a desktop computer, laptop computer, home entertainment console, etc.

As noted above, the display 120 of the device 110 may be a touch screen display for receiving user input. The exemplary processor 130 may receive user input from the display 120, as well as through other components of the device 110. The exemplary memory 140 may store instructions, including instructions related to the above-described software application, executable by the processor 130. Therefore, a user of the device 110 may interact with the software application stored in the memory 140 of the device 110. The processor 130 may process these user interactions and adjust the content presented by the display 110 accordingly.

It may be noted that the software application may interact with any number of components featured on the device 110 in addition to the display 120, processor 130 and memory 140. For instance, the device 110 may include a radio transceiver 150 (e.g., a wi-fi antenna, a cellular antenna, etc.). Using the radio transceiver 150, the software application may communicate with a network to receive updated data (e.g., software updates, content updates, etc.). The device 110 may also include further peripheral components, such as motion sensors, accelerometers, cameras, microphones, speakers, etc. The software application may provide the processor 130 with instructions to interact with any number of these peripheral components.

Figure 2:
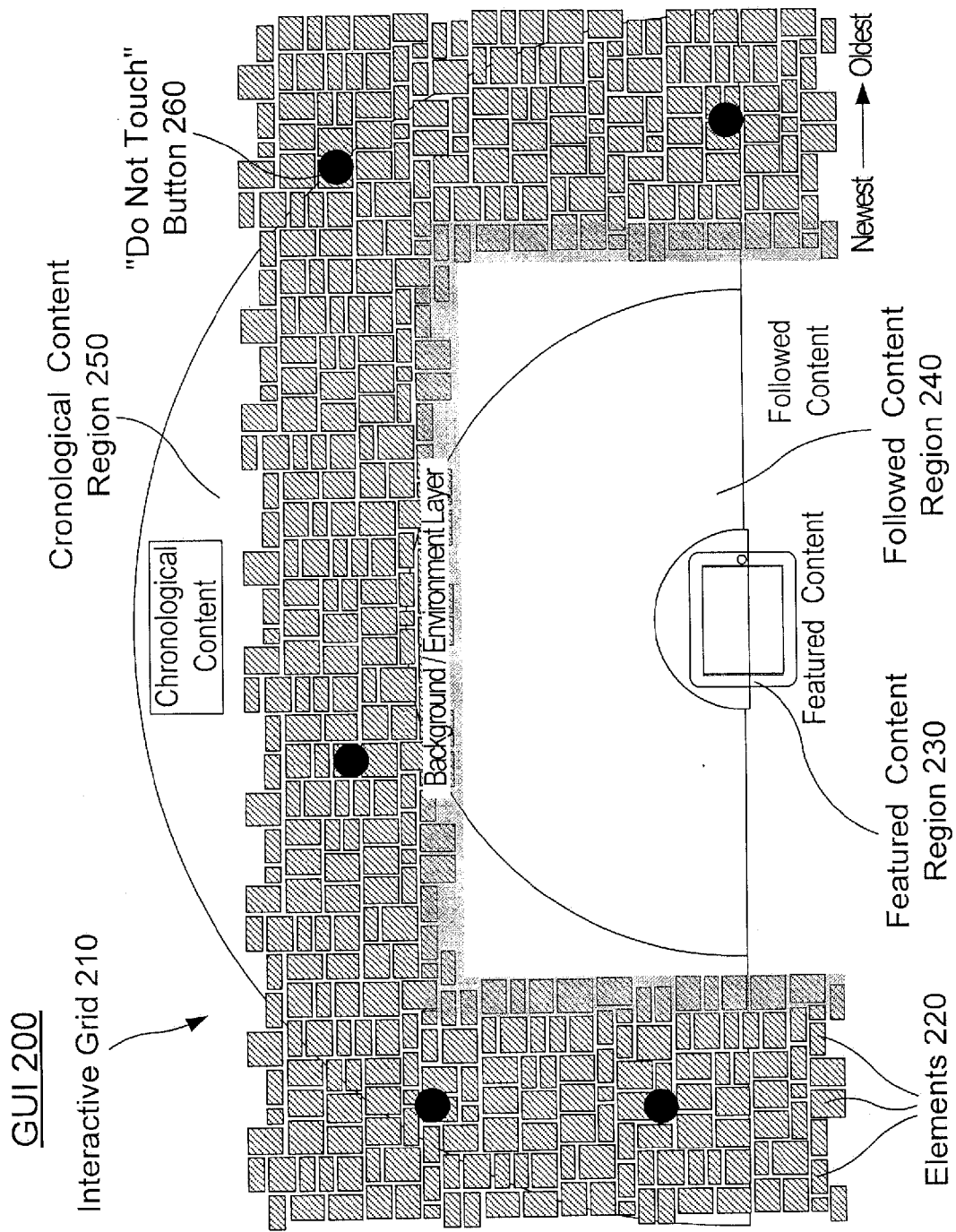
FIG. 2 shows an exemplary graphical user interface ("GUI") on the device running the software application according to an exemplary embodiment described herein.

FIG. 2 shows an exemplary GUI 200 on the device 110 running the software application according to an exemplary embodiment described herein. As noted above, the software application on the device 110 may present an interactive grid 210 to the user via the display 120. The interactive grid 210 may feature numerous moveable media elements 220 (e.g., tiles, images, etc.) to promote user exploration and discovery of branded content through the software operating on the device 110. In other words, by receiving user input (e.g., touch screen interactions, point and click input, etc.), the user may control the operation and display of various media content via the GUI 200 on the device 120.

The elements 220 of the interactive grid 210 may include a formatted structure to organize the content. For instance, the grid 210 may include a featured content region 230, a followed content region 240 and a chronological content region 250. The featured content region 230 may serve as a centralized hub of the grid 210 for displaying any selectively featured content. In addition, the followed content region 240 may allow for elements 220 to be categorized with other similar elements 220. According to one embodiment of the systems and methods, the categorization of the elements 220 may be implicitly (e.g., based on previous user consumption) or explicitly chosen. In addition, elements 220 related to particular property or actor may be placed within the followed content region 240. The chronological content region 250 may surround the featured content region 230 and may display media elements 220 chronologically. Specifically, the portion of the chronological content region 250 closest to the featured content region may include the most current content available to the software application.

As noted above, the software application may allow for the user to select specific content or content theme to follow as a user favorite. For instance, the user may select one or more individual pieces of content as a user favorite. In addition, the user may select all content related to a specific theme (e.g., property, actor, character, etc.) as being user favorite content. The user favorite option may allow for the user to easily track or follow all of the content that is most interesting to that user. Furthermore, the display of the grid 210 may be adjusted based on the user-selected favorites. For instance, all content related to a favorite content theme may be displayed in the followed content region 240 devoted to user favorites, such as in the form of highlighted or starred elements 220 displayed in the featured content region 230 of the grid 210. Accordingly, depending on the number of followed content, the size of the followed content region 240 may dynamically adjust. For example, a user following only one actor may have a followed content region 240 smaller than the followed content region 240 for a user following two actors, a property and a character. The content of all of the followed themes may be mixed within the adjustable followed content region 240.

As noted above, the newer content may be added to the grid 210 (e.g., the featured content region 230), while older content is pushed away from the center (e.g., within the chronological content region 250). It should be noted that the feature content region 230 may be exclusive to the content designated as featured (e.g., by the provider) and the followed content region 240 may be exclusive to the content designated as favorite/followed (e.g., by the user). Accordingly, any new content that is not featured or favorite content may be added to the portion of the chronological content region 250 that is closest to the followed content region 240 surrounding the featured content region 230.

The media elements 220 may be sized according to the type of media element, such as, but not limited to featured content, regular content, advertisements, "star" or followed content, media access content, etc. In addition, the size of the media elements 220 may vary based on various media types (e.g., video, picture, tweet, poll, etc.). While certain elements 220 of the grid 210 may be static photographs or text boxes, additional elements 220 may be selectable icons to initiate a further user experience, such as an audio and/or video playback over the display 120 of the device 110. In addition, certain content (e.g., full-length episodes of content) may be available to the user via a subscriber authentication process. Examples of the media content accessible by the software application may include instant videos, on-demand videos, full-length episodic video content, behind-the-scenes clips, photographs, news and media feeds, games, puzzles, user polls, advertisements, etc.

According to one embodiment, the interactive elements may lead the user off the grid display and outside of the software application, such as a website or application marketplace. Alternatively, each of the interactive experiences provided to the user may be confined to the exemplary software application. According to this embodiment, the user may not be able to open web content in a browser. Instead, the web content may be loaded in a web view so the user does not leave the application.

Further interactive experiences available through the exemplary software application may include hyperlinks to web-based content. For instance, the application may feature one or more hyperlinks directing a browser of the device 110 to various homepages of a content provider. In addition, one embodiment of the application may feature hyperlinks to other web-based interactions, such as loading media players, visiting social media websites, viewing an application market, recommending or downloading other software applications, etc.

Additional interactive experiences available through the exemplary grid 210 may include a media access button in the form of a "Do Not Touch" button 260. The Do Not Touch button 260 may be a soft button randomly placed in one or more locations throughout the grid 210. By depressing the Do Not Touch button 260, the user may trigger an array of disruptive audio and/or video playbacks for comedic effect. For instance, the Do Not Touch playback may feature a sequenced animation (e.g., PNG animation). In addition, the content display in response to the Do Not Touch button 260 may be interactive to the user. Each Do Not Touch button 260 within the grid 210 may trigger any number of different comedic elements that may cycle at random. Thus, the Do Not Touch button 260 may provide the user with a playful interactive experience of humor and surprises.

According to one embodiment, the background spokes may be visible to the user via the display 120 to provide the user with a sense of direction while navigating about the interactive grid 210 of elements 220. According to an alternative embodiment, the background spokes may be invisible to the user. Furthermore, the visibility of the background spokes may be a selectable option for the user.

The software application may also feature an "autopilot" mode, or demonstration mode, wherein the interactive grid 210 may automatically move (e.g., pan, scroll, zoom in/zoom out, etc.) without any user interaction. For instance, the software application may enter autopilot following a predetermined period of time without any user interaction (e.g., a timeout period). The autopilot mode may also serve as a demonstration of the capabilities of the software application. For instance, the autopilot mode may pan to a specific element 220 within the grid 210, zoom into the element 220, and select the element 220 as if the user had interacted with the element 220. During this demonstration, the content (audio and/or video) associated with this specific element 220 may initiate playback. Furthermore, the autopilot mode may be interrupted at any time through user interaction. For instance, if the user touches the display 120 of the device 110 during the autopilot demonstration, the software program may return to displaying the interactive grid 210 to the user.

New content may be added to the grid 210 of the software application via updates on a periodic basis (e.g., weekly, daily, etc.). As noted above, the device 110 operating the software application may include a radio transceiver 150 (or other network interface) to receive content and software updates. Specifically, newer elements 220 may be added or updated via the software updates. Similar to the elements 220, the audio/video content triggered by the Do Not Touch button 260 may also be updated on such periodic basis.

FIG. 3 shows an exemplary method 300 displaying media application including an interactive grid and populating the grid with media elements. The steps performed by the method 300 will be described in reference to the exemplary system 100 and GUI 200 and their respective elements as described above with reference to FIGS. 1 and 2. For instance, the media application may include a set of instructions executable by the processor 130 of the personal media device 110.

As described above, the interactive grid 210 may include a featured content region 230, a followed content region 240, a chronological content region 250, as well as any number of media elements 220 delivered to the software application by a content provider. The media elements 220 may include information content, entertainment content, educational content, advertising and promotional content, commerce content, etc. Examples of the content may include audio and/or video clips, full-length programming episodes, commercials, games, social media and/or news feeds, learning aids and tools, advertisements, etc.

One skilled in the art will understand that the exemplary method 300 describes one of any number of methods for populating the interactive grid of the media elements. While method 300 describes a time-based comparison for the placement of media elements within the grid, alternative placement methods may be implemented by the exemplary software application. For instance, the placement of the media elements within the regions of the grid 210 may be dependent on content provider preferences (e.g., featured media, promotional media, etc.), user preference (e.g., favorites, followed actor/property, etc.), randomized placement, etc. Thus, the population of the media elements within the interactive grid is not limited to the method 300 described in FIG. 3.

In step 310, the method 300 may display an interactive grid 210 including a chronological content region 250 surrounding a followed content region 240 and a feature content region 230. As noted above, the feature content region 230 may be a centralized single media element or a grouping of media elements presented to the user upon starting up the software application. The feature content region 230 may include default content, featured content, promotional/advertisement content, a logo of the content provider, etc.

In step 320, the method 300 may receive new content from the content provider. As noted above, the software application may execute on a user device 110 (e.g., a tablet computer) that includes a radio transceiver 150. For instance, the software application may interface for the network via the transceiver 150 to query the content provider on the availability of newer content. Accordingly, the software application may periodically connect to a network, such as on a daily basis or a per-use basis, to receive and download the latest content available to the interactive grid 210.

In step 330, the method 300 may insert a first media element 220 onto the chronological content region 250 of the grid 210. According to an exemplary embodiment, the first media element 220 may include a corresponding timestamp indicating a date and time of the content. Furthermore, as detailed above, certain media elements may provide the user with an interactive audio-video experience. For instance, certain media elements may be used to activate a media file stored on the device 110, or alternatively, stored remotely over the network. In other words, the user may interact with the file element (e.g., press on the element via a touch screen of the device 110) to activate associated media files, such as video clips, games, web-links, advertisements, etc. While certain media elements may be associated with store media files, other elements may simply be text boxes or photographs displayed over the grid 210.

In step 340, the method 300 may insert a second media element 220 onto the chronological content region 250 of the grid 210, the second media element 220 including a second timestamp. Similar to the first media element 220, the second media element 220 may be used to activate a second media file. Furthermore, the second media element 220 may be related to the first media element 220. For instance, the relationship between the first and second media elements 220 may be based on one of a common actor, a common character, a common property, a common theme, etc.

In step 350, the method 300 may compare the first timestamp of the first media element 220 to the second timestamp of the second media element 220. As noted above, the format of the grid 210 may be time-based, wherein the latest content is inserted at or close to the central hub of the featured content region 230, while the older content is pushed away from the hub towards a perimeter of the grid 210. Accordingly, in step 360, the method 300 may arrange the presentation of the first and second media elements 220 within the chronological content region 250 based on the compared first and second timestamps.

In step 370, the method 300 may eliminate one or more media elements from the interactive grid 210. Content may be eliminated from the grid 210 based on any number of reasons. For instance, content may be eliminated from the grid 210 based on the timestamp of the media element 220. According to this example, a predetermined expiration date may be set for each media element 220, and the media element 220 may be removed at this date. Additionally or alternatively, content may be eliminated from the grid 210 based on a capacity for elements displayable on the grid 210. According to this example, a predetermined number of elements may be set for the grid 210 and/or for the chronological content region 250, and the oldest media element 220 may be removed from the grid 210 upon exceeding the predetermined number of elements for the grid 210 or the chronological content region 250.

According to the exemplary systems and methods described herein, the software application may serve as a creative sandbox for delivering branded content to the user on a reoccurring basis. The software application may allow for new material to be introduced to a user base in a fun and interactive manner. For instance, the content may include spin-off content from existing programming. The content may also serve as a companion component to additional content delivered through different mediums (e.g., television programming). For instance, the content from the software application may provide the user with more detailed information about a property currently airing on television, thereby providing the user with a more in-depth viewing experience.

Those of skill in the art will understand that the above-described exemplary embodiments may be implemented in any number of matters, including as a software application, as a software program, etc. For example, the exemplary method 300 may be embodied in a program stored in a non-transitory storage medium and containing lines of code that, when compiled, may be executed by a processor (e.g., processor 130 of computing device 110). Furthermore, one skilled in the art will understand that the exemplary software application may be coded in any computer readable language, such as, for example, a markup language (e.g., HTML5, etc.).

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method performed by a computer processor for formatting data for display on a user device, comprising:
    generating a grid including a central hub and a plurality of spokes connected to the central hub;
    inserting a first media element onto a first spoke of the grid, the first media element including a first timestamp and activating a first media file;
    inserting a second media element on the first spoke of the grid, the second media element including a second timestamp and activating a second media file, wherein the second media file is related to the first media file;
    comparing the first timestamp to the second timestamp;
    arranging the presentation of the first and second media elements along the first spoke in series based on the compared first and second timestamps;
    eliminating the first media element from the grid based on one of the first timestamp and a predetermined capacity for elements displayable on the grid; and
    providing the grid to a user computer for display thereby,
    wherein the central hub is a featured content region for displaying a featured media element, the featured content region being surrounded by a chronological content region including the spokes.

2. The method of claim 1, further comprising:
    receiving the first and second media elements from a content provider over a network.

3. The method of claim 1, further comprising:
    determining the availability of a further media element from a content provider over a network;
    receiving the further media element, the further media element including a further timestamp and is related to the first and second media elements;
    comparing the further timestamp to the first and second timestamps; and
    arranging the presentation of the first, second and further media along the first spoke in series based on the compared first and second timestamps.

4. The method of claim 1, wherein the first media element is related to the second media element based on one of a common actor, a common character, a common property, and a common theme.

5. The method of claim 1, further comprising:
    displaying a soft button within the displayed grid instructing a user to not depress the soft button; and
    activating a disruptive media file upon receiving user interaction with the soft button.

6. The method of claim 1, further comprising:
    activating an autopilot mode for the displayed grid demonstrating examples of user interactions with the displayed grid.

7. A non-transitory computer readable storage medium with an executable program stored thereon, wherein the program instructs a processor to perform actions that include:
    displaying a grid including a central hub and a plurality of spokes connected to the central hub;
    inserting a first media element on a first spoke of the grid, the first media element including a first timestamp and activating a first media file;
    inserting a second media element on the first spoke of the grid, the second media element including a second timestamp and activating a second media file, wherein the second media file is related to the first media file;
    comparing the first timestamp to the second timestamp;
    arranging the presentation of the first and second media elements along the first spoke in series based on the compared first and second timestamps; and
    eliminating the first media element from the grid based on one of the first timestamp and a predetermined capacity for elements displayable on the grid,
    wherein the central hub is a featured content region for displaying a featured media element, the featured content region being surrounded by a chronological content region including the spokes.

8. The computer readable storage medium of claim 7, wherein the actions further include:
    receiving the first and second media elements from a content provider over a network.

9. The computer readable storage medium of claim 7, wherein the actions further include:
    determining the availability of a further media element from a content provider over a network;
    receiving the further media element, the further media element including a further timestamp and is related to the first and second media elements;
    comparing the further timestamp to the first and second timestamps; and
    arranging the presentation of the first, second and further media elements along the first spoke in series based on the compared first and second timestamps.

10. The computer readable storage medium of claim 7, wherein the first media element is related to the second media element based on one of a common actor, a common character, a common property, and a common theme.

11. The computer readable storage medium of claim 7, wherein the actions further include:
    displaying a soft button within the displayed grid instructing a user to not depress the soft button; and
    activating a disruptive media file upon receiving user interaction with the soft button.

12. The computer readable storage medium of claim 7, wherein the actions further include:
    activating an autopilot mode for the displayed grid demonstrating examples of user interactions with the displayed grid.

13. A device, comprising:
    a memory storing a plurality of rules; and
    a processor coupled to the memory and performing actions that include:
        formatting a grid for display on a user device, the grid including a central hub and a plurality of spokes connected to the central hub;
        inserting a first media element on a first spoke of the grid, the first media element including a first timestamp and activating a first media file;
        inserting a second media element on the first spoke of the grid, the second media element including a second timestamp and activating a second media file, wherein the second media file is related to the first media file;
        comparing the first timestamp to the second timestamp;
        arranging the presentation of the first and second media elements along the first spoke in series based on the compared first and second timestamps; and eliminating the first media element from the grid based on one of the first timestamp and a predetermined capacity for elements displayable on the grid, wherein the central hub is a featured content region for displaying a featured media element, the featured content region being surrounded by a chronological content region including the spokes.

14. The device of claim 13, wherein the processor further performs actions that include:

determining the availability of a further media element from a content provider over a network;

receiving the further media element, the further media element including a further timestamp and is related to the first and second media elements;

comparing the further timestamp to the first and second timestamps; and arranging the presentation of the first, second and further media elements along the first spoke in series based on the compared first and second timestamps.

15. The device of claim 13, wherein the first media element is related to the second media element based on one of a common actor, a common character, a common property, and a common theme.

\* \* \* \* \*